(12) United States Patent
Choi et al.

(10) Patent No.: US 10,572,144 B2
(45) Date of Patent: Feb. 25, 2020

(54) INPUT PROCESSING METHOD AND APPARATUS OF ELECTRONIC DEVICE

(71) Applicant: Samsung Electronics Co., Ltd., Gyeonggi-do (KR)

(72) Inventors: Hyunsuk Choi, Daegu (KR); Gyucheol Choi, Gyeongsangbuk-do (KR)

(73) Assignee: Samsumg Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 532 days.

(21) Appl. No.: 14/621,859

(22) Filed: Feb. 13, 2015

(65) Prior Publication Data

US 2015/0234528 A1  Aug. 20, 2015

(30) Foreign Application Priority Data

Feb. 20, 2014  (KR) .................. 10-2014-0019698

(51) Int. Cl.
| | | |
|---|---|---|
| *G06F 3/041* | (2006.01) | |
| *G06F 3/0482* | (2013.01) | |
| *G06F 3/0488* | (2013.01) | |
| *G06F 3/0354* | (2013.01) | |
| *G06F 3/038* | (2013.01) | |
| *G06F 3/0481* | (2013.01) | |
| *G06F 3/0484* | (2013.01) | |

(52) U.S. Cl.
CPC .......... *G06F 3/04883* (2013.01); *G06F 3/038* (2013.01); *G06F 3/0383* (2013.01); *G06F 3/03545* (2013.01); *G06F 3/0488* (2013.01); *G06F 2203/04101* (2013.01); *G06F 2203/04108* (2013.01)

(58) Field of Classification Search
CPC .. G06F 3/0416; G06F 3/0412; G06F 3/03545; G06F 3/038; G06F 3/04817; G06F 3/0482; G06F 3/04842; G06F 3/04883
See application file for complete search history.

(56) References Cited

U.S. PATENT DOCUMENTS

| | | | | |
|---|---|---|---|---|
| 8,132,106 B2 * | 3/2012 | Low | ...................... | G06F 17/212 358/527 |
| 8,941,626 B1 * | 1/2015 | Yeh | ...................... | G06F 3/03545 345/156 |
| 9,104,251 B1 * | 8/2015 | Omelchuk | ........... | G06F 3/03545 |

(Continued)

FOREIGN PATENT DOCUMENTS

| | | |
|---|---|---|
| KR | 95-25586 A | 9/1995 |
| KR | 10-2012-0138565 A | 12/2012 |
| KR | 10-2013-0032808 A | 4/2013 |

*Primary Examiner* — Shourjo Dasgupta
(74) *Attorney, Agent, or Firm* — Cha & Reiter, LLC.

(57) ABSTRACT

A method and electronic device implementing the same are disclosed herein. The electronic device includes a touchscreen which may detect a touch input, a hover input and a frequency from a stylus, and display a particular application. The device may further include a control unit implementing the method, which includes detecting, via the touchscreen, the hover input generated by proximity of the stylus to the touchscreen and the frequency generated by the stylus, and execute a function corresponding to the particular application, the hover input and the detected frequency.

15 Claims, 16 Drawing Sheets

(56) References Cited

U.S. PATENT DOCUMENTS

| | | | |
|---|---|---|---|
| 2004/0008189 A1* | 1/2004 | Clapper | G06F 3/03545 345/179 |
| 2007/0136750 A1* | 6/2007 | Abanami | H04N 5/44543 725/44 |
| 2009/0167702 A1* | 7/2009 | Nurmi | G06F 3/0346 345/173 |
| 2010/0206644 A1* | 8/2010 | Yeh | G06F 3/03545 178/18.07 |
| 2011/0007001 A1* | 1/2011 | Liu | G06F 3/03545 345/173 |
| 2011/0145689 A1* | 6/2011 | Campbell | G06F 17/248 715/209 |
| 2012/0327040 A1* | 12/2012 | Simon | G06F 3/03545 345/179 |
| 2012/0327041 A1* | 12/2012 | Harley | G06F 3/03545 345/179 |
| 2013/0317951 A1* | 11/2013 | Kuznetsov | G06F 17/30817 705/27.1 |
| 2014/0028634 A1* | 1/2014 | Krah | G06F 3/041 345/179 |
| 2014/0078116 A1* | 3/2014 | Mercea | G06F 1/266 345/179 |
| 2014/0186026 A1* | 7/2014 | Oshima | H04B 10/116 398/25 |
| 2014/0186049 A1* | 7/2014 | Oshima | H04B 10/1143 398/118 |
| 2014/0186050 A1* | 7/2014 | Oshima | H04B 10/1143 398/118 |
| 2014/0186055 A1* | 7/2014 | Oshima | H04B 10/541 398/186 |
| 2014/0207517 A1* | 7/2014 | Oshima | H04N 5/2356 705/7.29 |
| 2014/0210744 A1* | 7/2014 | Song | G06F 3/03545 345/173 |
| 2014/0253465 A1* | 9/2014 | Hicks | G06F 3/03545 345/173 |
| 2014/0253470 A1* | 9/2014 | Havilio | G06F 3/0412 345/173 |
| 2014/0253520 A1* | 9/2014 | Cueto | G06F 3/0383 345/179 |
| 2014/0286644 A1* | 9/2014 | Oshima | H04B 10/11 398/118 |
| 2015/0029132 A1* | 1/2015 | Yeh | G06F 3/046 345/174 |

* cited by examiner

<301>  <305>

FIG. 13
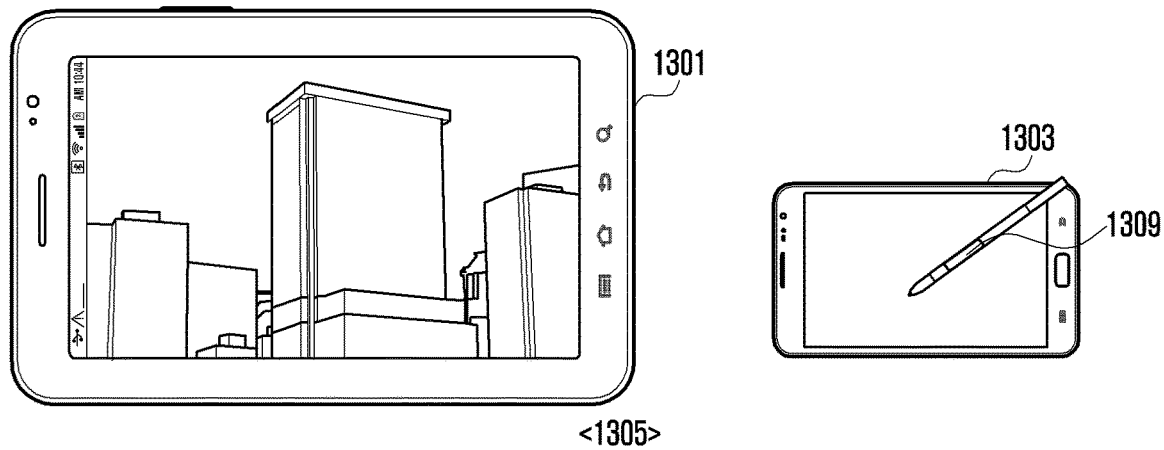
<1305>
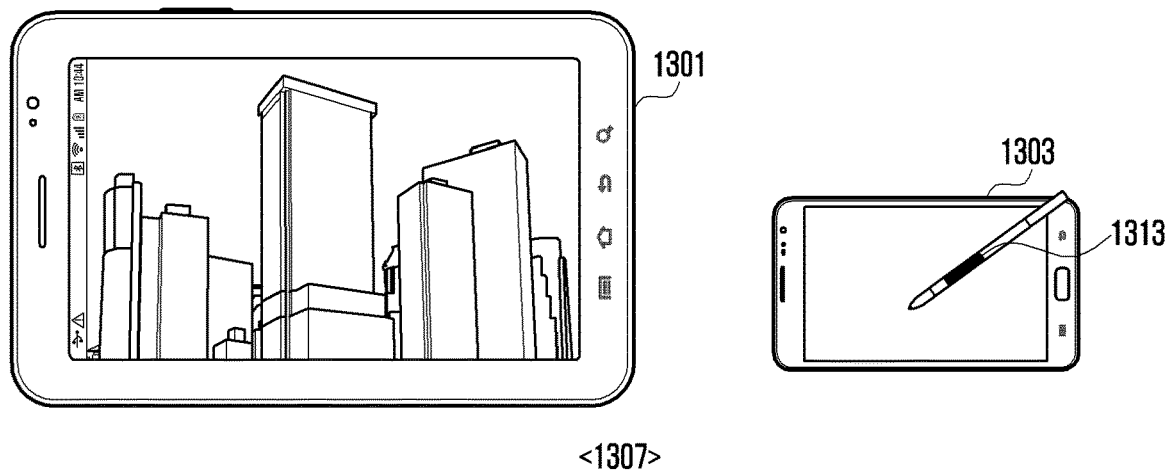
<1307>
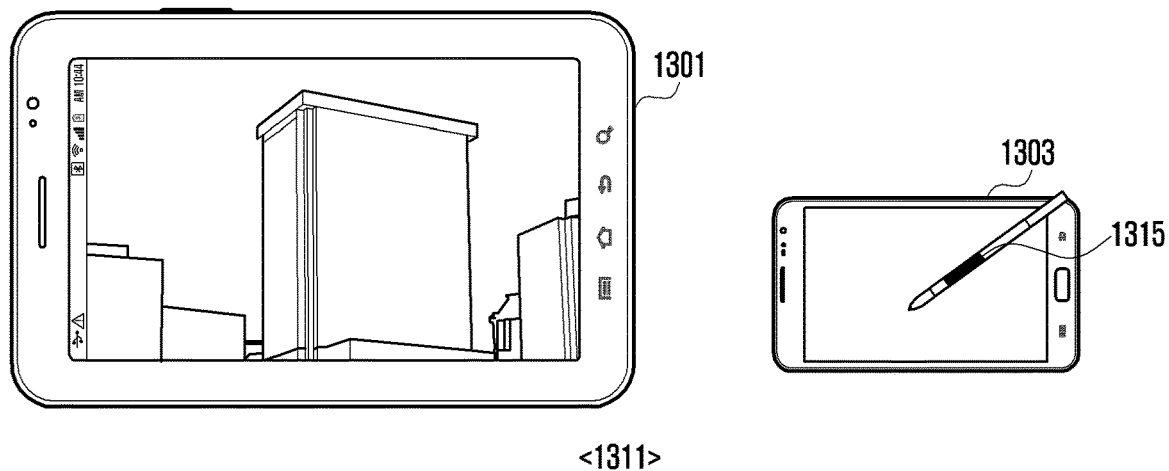
<1311>

INPUT PROCESSING METHOD AND APPARATUS OF ELECTRONIC DEVICE

CROSS-REFERENCE TO RELATED APPLICATIONS

This application claims the benefit under 35 U.S.C. § 119(a) of a Korean patent application filed on Feb. 20, 2014 in the Korean Intellectual Property Office and assigned Serial No. 10-2014-0019698, the entire disclosure of which is hereby incorporated by reference.

TECHNICAL FIELD

The present disclosure relates to an input processing method and apparatus of an electronic device equipped with a touch device.

BACKGROUND

With the advance of digital technology, various types of electronic devices capable of communication and processing personal information have emerged, such as mobile communication terminal, Personal Digital Assistant (PDA), smartphone, and table Personal Computer (PC). These electronic devices are generally capable of supporting various functions such as a communication function, a document and email composition function, a media (music and motion picture) layback function, a schedule organization function, an Internet function, a Social Networking Service (SNS) function, and a phonebook function.

The electronic device may be provided with a touch panel which is capable of operating in a touch input mode or proximity input mode (e.g. hovering input mode and motion and gesture recognition mode). Here, the touch input mode is the operation mode for detecting a user input made onto a specific area on the touchscreen displaying contents and performing an operation according to the detected user input. The proximity input mode is the operation mode for detecting a user input made with a material above the screen without contact, i.e. in non-contact manner, and performing an operation according to the signal corresponding to the user input. In the non-contact gesture input mode, the proximity input (e.g. hovering) can be made with an input tool (e.g. user's finger and electronic pen.

The electronic device may be capable of detecting the proximity input made by placing the pointer above a certain area of the touchscreen and executing a function such as object selection function, object execution function, and a preview function for presenting internal information or supplementary information like air view function in response to the proximity input, thereby improving user convenience.

The proximity input may be distinguished from the touch input based on whether the input gesture is a touch gesture or a hovering gesture. This may be done, for example, to provide a view function, which, although simple, is not highly practical, and thus, it is not used frequently. Since the proximity gestures are not only distinct just limited to execution of a simple function such as view function, there is lack of motivation for the user to use the proximity input mode.

SUMMARY

The present disclosure provides an input processing method and apparatus of an electronic device that is capable of analyzing a proximity input into a first frequency input and a second frequency input transitioning therefrom. Also, the present disclosure provides an input processing method and apparatus of an electronic device that is capable of checking the type of the proximity input based on the first frequency and the second frequency transitioning therefrom to execute the specific function corresponding to the type of the proximity input.

The present disclosure provides an input processing method and apparatus of an electronic device that is capable of distinguishing between the frequencies generated by an electronic pen with or without push on a button of the electronic pen, extracting coordinates of the frequency input location, and executing a function corresponding to the coordinates.

In accordance with an aspect of the present disclosure, an input processing method of an electronic device is provided. The input processing method includes analyzing, when at least one proximity input is detected, the proximity input to extract a frequency, determining a type of the proximity input based on the frequency, and executing a function corresponding to the type of the proximity input.

In another aspect of this disclosure, an input processing method of an electronic device is disclosed including detecting, via a touchscreen, a hover input generated by proximity of a stylus to the touchscreen and a frequency generated by the stylus, and executing by a processor of the electronic device a function corresponding to an particular application, the hover input and the detected frequency.

In another aspect of this disclosure, an electronic device is disclosed including a touchscreen configured to detect a touch input, a hover input and a frequency from a stylus, and display an particular application, and a control unit configured to detect, via the touchscreen, the hover input generated by proximity of the stylus to the touchscreen and the frequency generated by the stylus, executing a function corresponding to the particular application, the hover input and the detected frequency.

BRIEF DESCRIPTION OF THE DRAWINGS

FIG. 13 is a diagram illustrating example screen displays for explaining a proximity input processing operation between electronic devices according to an embodiment of the present disclosure;

DETAILED DESCRIPTION

Figure 1:
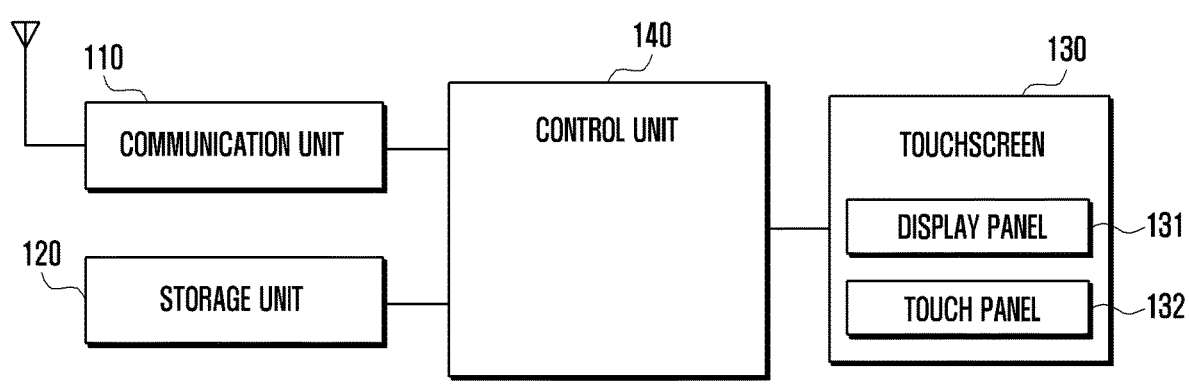
FIG. 1 is a block diagram illustrating an example configuration of the electronic device equipped with a touch device according to an embodiment of the present disclosure.

Example embodiments of the present disclosure are described with reference to the accompanying drawings in detail. Although the description is made with reference to particular embodiments, the present disclosure can be implemented with various modifications. Thus, it should be understood that there may be various equivalents and modified examples that can replace the embodiments described in the present specification and the configuration shown in the drawings. The same reference numbers are used throughout the drawings to refer to the same or like parts.

It will be understood that the expressions "comprises" and "may comprise" is used to specify presence of disclosed function, operation, component, etc. but do not preclude the presence of one or more functions, operations, components, etc. It will be further understood that the terms "comprises" and/or "has" when used in this specification, specify the presence of stated feature, number, step, operation, component, element, or a combination thereof but do not preclude the presence or addition of one or more other features, numbers, steps, operations, components, elements, or combinations thereof.

In the present disclosure, the expression "and/or" is taken as specific disclosure of each and any combination of enumerated things. For example, A and/or B is to be taken as specific disclosure of each of A, B, and A and B.

As used herein, terms such as "first," "second," etc. are used to describe various components, however, it is obvious that the components should not be defined by these terms. For example, the terms do not restrict the order and/or importance of the corresponding components. The terms are used only for distinguishing one component from another component. For example, a first component may be referred to as a second component and likewise, a second component may also be referred to as a first component, without departing from the teaching of the inventive concept.

Unless otherwise defined herein, all terms including technical or scientific terms used herein have the same meanings as commonly understood by those skilled in the art to which the present disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

According to various embodiments of the present disclosure, the electronic device has a communication function. Examples of the electronic device include a smartphone, a table Personal Computer (PC), a mobile phone, a video phone, an electronic book (ebook) reader, a desktop PC, a laptop computer, a netbook computer, a Personal Digital Assistant (PDA), a Portable Multimedia Player (PMP), an MP3 player, a mobile medical appliance, a camera, a wearable device (e.g. electronic glasses and Head Mounted Device (HMD)), an electronic cloth, an electronic bracelet, an electronic necklace, an electronic appcessory, an electronic tattoo, and a smartwatch.

According to various embodiments of the present disclosure, the electronic pen may generate a frequency by means of an external or internal power source. The frequency may be generated according to a touch or proximity input. The first frequency circuit for generating the frequency is designed to have a center frequency F0 of which strength (magnitude) may vary depending on the external or internal power (current or voltage) source, internal circuit efficiency, and distance from the external power source. The electronic pen may include a second frequency circuitry for changing the frequency. The second frequency circuit may change the value or strength (magnitude) of the frequency generated by the first frequency circuit. For example, if the first frequency circuit is activated, the center frequency F0 is generated and then, if the second frequency circuit is activated, the center frequency changes as much as $\Delta F$ so as to be $F0+\Delta F$. Here, $\Delta F$ as a value for distinguishing between the first and second frequencies may be tiny or large. The electronic pen may further include an activation device for activating the second frequency circuit. The activation device may be provided on the electronic pen in the form of, but not limited to, a button, a switch, and a touch key. The activation device may be turned on to generate the frequency $F0+\Delta F$. Since the type of a proximity input is determined depending on whether the activation device is switched on or off, it is possible to make various proximity inputs for executing different functions. How to distinguish between the first and second frequencies is not limited to the above described method, but the first and second frequencies may be distinguished based on the strength and location of the frequency generated by the electronic device and the size of the detection area.

FIG. 1 is a block diagram illustrating a configuration of the electronic device equipped with a touch device according to an embodiment of the present disclosure.

As shown in FIG. 1, the electronic device according to an embodiment of the present disclosure includes a communication unit 110, a storage unit 120, a touchscreen 130, and a control unit 140.

The communication unit 110 is responsible for voice communication, video communication, and data communication with another device through a network. The communication unit 110 may include a Radio Frequency (RF) transmitter for up-converting and amplifying the transmission signal and an RF receiver for low noise amplifying and down-converting the received signal. The communication also may include a modulator and a demodulator. The modulator and demodulator may support Code Division Multiple Access (CDMA), Wideband CDMA (WCDMA), Long-Term Evolution (LTE), Wi-Fi, Wireless Broadband (WIBRO), Bluetooth, and Near Field Communication (NFC). The communication unit 110 may include at least one of a cellular communication module, an Internet access module, or a short range communication module.

The storage unit 120 may include a program memory for storing operation programs of the electronic device and a data memory for storing data generated when the programs are running.

The touchscreen 130 may integrate the display panel 131 and the touch panel 132. The display panel 131 may display various screens generated in the electronic device under the control of the control unit 140. The display panel 131 may be implemented with one of a Liquid Crystal Display (LCD), an Organic Light Emitting Diodes (OLED), an Active Matrix OLED (AMOLED), a flexible display, a bended display, and a 3-Dimensional (3D) display. The display panel 131 also may be implemented so as to be flexible, transparent, and wearable. The touch panel 132 may integrate a hand touch panel for detecting a hand gesture and a pen touch panel for detecting a pen gesture. The touch panel 132 may detect the frequency having a periodicity such as residual frequency, RF frequency, optical frequency, vibration frequency, and acoustic frequency.

According to various embodiments, if a proximity input (e.g. hovering) recognized with the change of frequency input (e.g. change of frequency strength and location and change of size or volume of the detection area) on the touch panel in the course of displaying a screen on the display panel, the touch panel generates the corresponding proximity input signal to the control unit 140. The display pane 131 may display an execution screen of the specific function executed in response to the proximity input under the control of the control unit 140.

The control unit 140 controls the overall operations and internal components of the electronic device, data processing, and power supply from the battery to the internal components.

According to various embodiments, the control unit 140 may control the display panel 131 to display a screen. If a proximity input is detected on the screen, the control unit 140 analyzes the frequency of the detected proximity input. For example, the control unit 140 checks the first frequency input and the second frequency input transitioning from the first frequency input. The control unit 140 may determine the type of the proximity input based on the combination of the first and second frequencies. The control unit 140 may execute and control the function corresponding to the proximity input type. "Transitioning" may include a number of operations. For example, transitioning may include crossing a boundary of the touch panel, from outside the touch panel to the inside the boundary, while not pushing the button of the electronic pen. Transitioning may also include crossing a boundary of the touch panel, from the outside the boundary to the inside the boundary, while pushing the button of the electronic pen. Further, transitioning may also include detecting a gesture by the touch panel in which the pen changes from a state where the button of the electronic pen is not activated, to a state that the button of the electronic pen is activated.

Although not shown, the electronic device may further include other components such as a Global Positioning System (GPS) module for receiving location information, an audio processing unit having a microphone and a speaker, and an input unit supporting hard key-based input.

Figure 2:
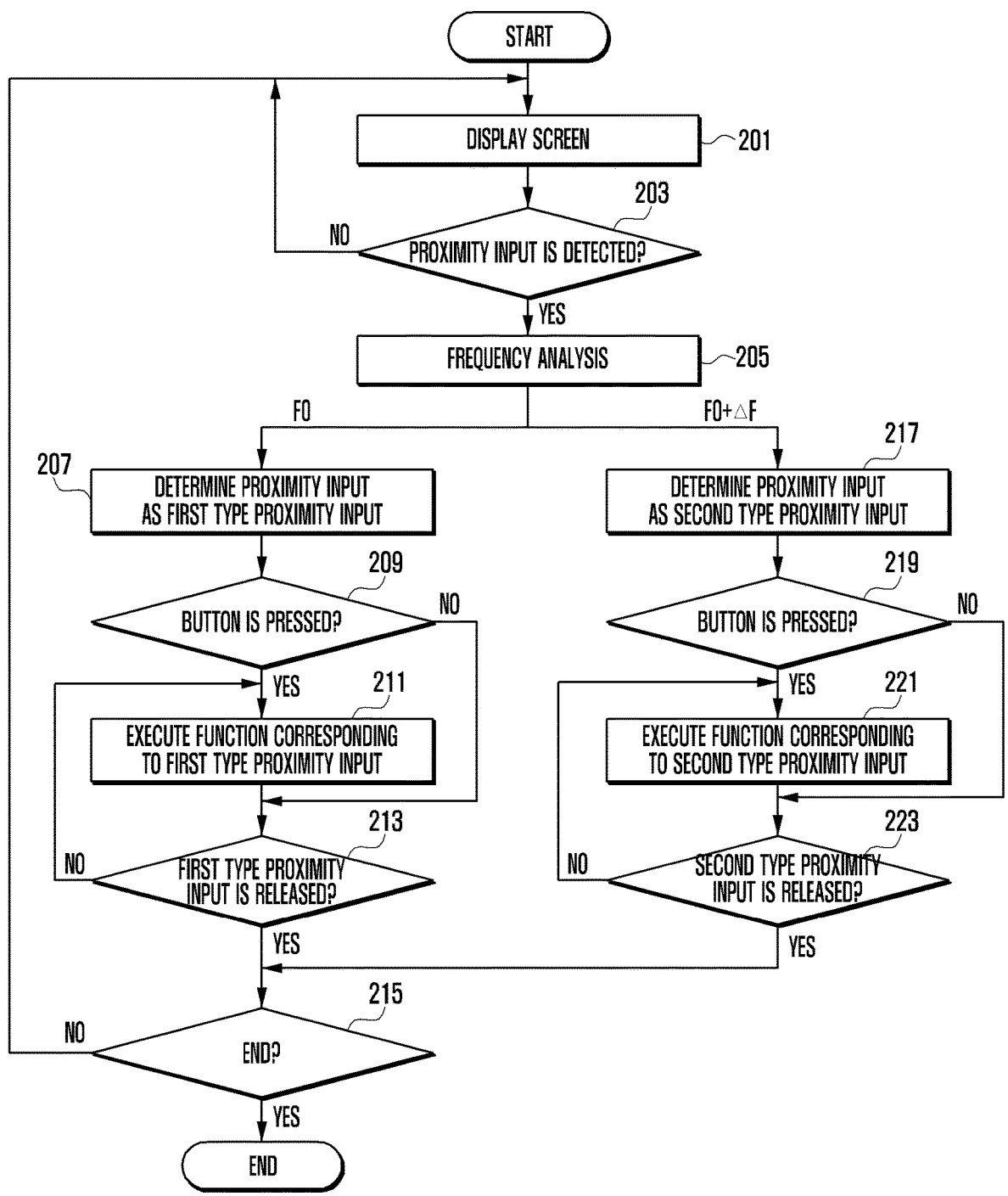
FIG. 2 is a flowchart illustrating an example proximity input processing method according to an embodiment of the present disclosure.

FIG. 2 is a flowchart illustrating a proximity input processing method according to an embodiment of the present disclosure.

Figure 3A:
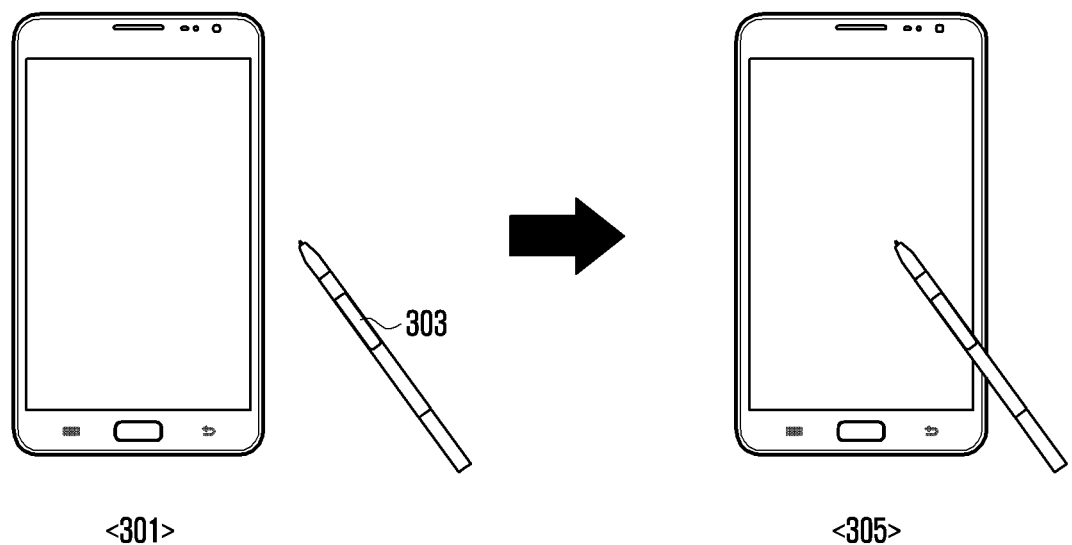
FIG. 3A and FIG. 3B are diagrams illustrating example proximity input gestures for assisting explanation of the proximity input processing method of FIG. 2.
Figure 3B:
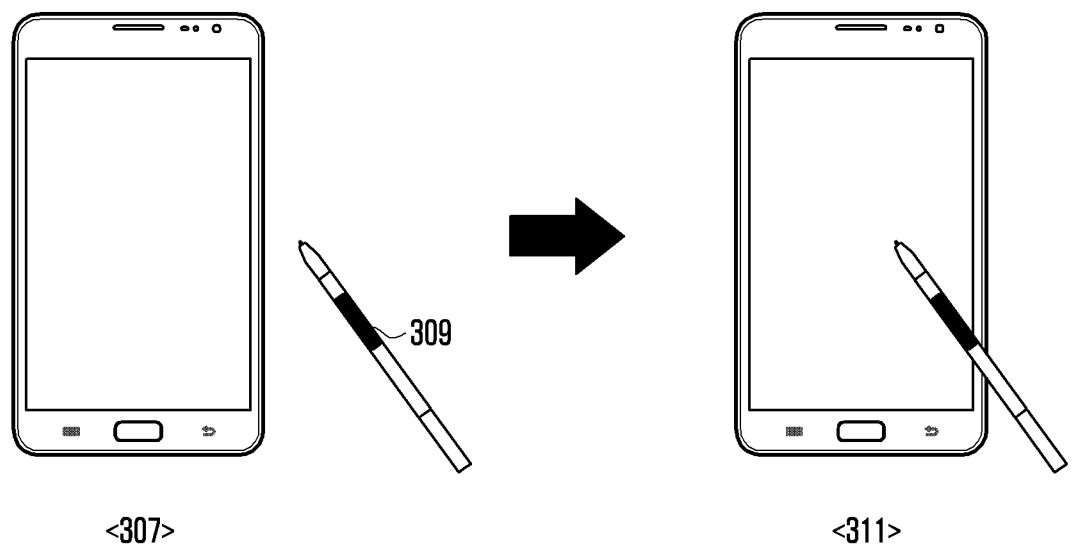

FIGS. 3A and 3B are diagrams illustrating proximity input gestures for assisting explanation of the proximity input processing method of FIG. 2.

Referring to FIGS. 2, 3A, and 3B, the control unit 140 controls the display unit 131 to display a screen at operation 201. Here, the screen may be an execution screen of a particular application such as a music application, a video application, a word processor application, an ebook application, a web browser application, a map application, and a memo application. The application execution screen may include icons, thumbnail images, list items, menu items, text items, and link items.

Next, the control unit 140 determines whether a proximity input is detected above the touch panel 132 in the course of displaying the screen at operation 203. Here, the proximity input may include a hovering gesture made by means of an input tool (e.g. user's finger and electronic pen) in a predetermined distance range above the surface of the touchscreen 130 with contact. For example, if the input tool (e.g. user's finger and electronic pen) is positioned 1-2 cm above the touch screen 130, it can be determined that that a proximity input is made. According to various embodiments, it is assumed that the input tool is the electronic pen.

If the proximity input is made, the control unit 140 detects the proximity input at operation 203 and performs frequency analysis on the proximity input at operation 205.

In detail, if a transition gesture crossing a boundary of the touch panel from the outside to the inside the boundary of the touch panel 132 while the button of the electronic pen is not pushed, the control unit 140 detects the frequency F0. For example, if the electronic pen moves from the outside (as shown in part <301> of FIG. 3A) to the inside (as shown in part <305> of FIG. 3A) of the touch panel 132 without activation of the button (as denoted by reference number 303), the control unit 140 detects the frequency F0. That is, if a gesture moving from the outside (frequency=Null) to the inside (frequency=F0) of the touch panel 132 is made, the frequency changes from Null to F0. According to various embodiments, if the frequency generated by the proximity input made with the electronic pen changes from Null to F0, this is determined as the first type proximity input.

If a gesture moving the outside to the inside of the boundary of touch panel 132 while the button of the electronic pen is pushed, the control unit 140 detects the frequency F0+ΔF. For example, if the electronic pen moves from the outside (as shown in part <307> of FIG. 3B) to the inside (as shown in part <311> of FIG. 3B) of the touch panel 132 without button push (as denoted by reference number 309), the control unit 140 detects the frequency F0+ΔF. That is, if a gesture moving from the outside (frequency=Null) to the inside (frequency=F0+ΔF) of the touch panel 132 is made, the frequency changes from Null to F0+ΔF. According to various embodiments, if the frequency generated by the proximity input made with the electronic pen changes from Null to F0+ΔF, this is determined as the second type proximity input. If the frequency is the Null value, this may be a state where there is a basic input frequency other than no frequency.

The control unit may determine the proximity input type through frequency analysis and execute a function corresponding to the proximity input type. For example, the proximity input type-specific functions may include an information or function reset or maintenance function, a navigation direction or reference point change function, an inverse function, a function or screen switching function, an original function execution function, and an original function reinforcement function.

According to various embodiments, the proximity input type-specific function may include a function resetting the original information or function in response to the first type proximity input and a function maintaining the original information or function in response to the second type proximity input.

According to various embodiments, the proximity input type-specific functions may include a forward navigation function for navigating functions or information in the forward direction in response to the first type proximity input and a backward navigation function for navigating functions or information in the backward direction in response to the second type proximity input. The control unit 140 also may execute a function of changing the reference point for navigating functions or information in response to the second type proximity input.

According to various embodiments, the proximity input type-specific functions may include the functions executing the original and inverse functions corresponding to the types of the proximity inputs. For example, if the first type proximity input is detected on the memo screen, the control unit 140 may execute a memo and drawing function and, if the second type proximity input is detected, an inverse function (e.g. an eraser function, the reversal of which is both intuitive and utilized frequently).

According to various embodiments, the proximity input type-specific functions may include a switching function. For example, if the first type proximity input is detected on the memo screen, the control unit 140 may execute the memo and drawing function and, if the second type proximity input is detected, switching from the current screen to another application execution screen or an application list screen allowing for execution of a specific application.

According to various embodiments, the proximity input type-specific functions may include a proximity input type-specific original function and a function using the execution function. For example, the control unit 140 may execute the memo and drawing functions in response to the first type proximity input and a function processing the memo written and/or drawn in response to the first type proximity input.

According to various embodiments, the proximity input type-based functions may include the original function executed depending the proximity input type and a reinforcing the original function. Assuming the electronic pen works as a mouse and the electronic device as a mouse pad, the control unit 140 executes a pen mouse function with a basic pointer movement speed and resolution in response to the first type proximity input and a function of decreasing/increasing the resolution and pointer movement speed om response to the second type proximity input.

A description is made of the proximity input type-specific functions in detail with reference to the accompanying drawings.

If the frequency F0 is detected through the frequency analysis on the proximity input at operation 205, the control unit 140 determines the proximity input as the first type proximity input at operation 207. Next, the control unit 140 determines whether the button of the electronic pen is pushed in the course of detecting the first type proximity input at operation 209. If the button is pushed in the state that the frequency F0 is maintained, the frequency changes to F0+ΔF.

If the button is not pushed, the control unit 140 determines whether the first type proximity input is released (e.g., removed from proximity of the screen) at operation 213. Otherwise if the button is pushed, the control unit 140 executes a function corresponding to the first type proximity input at operation 211. Then the control unit 140 determines whether the first type proximity input is released at operation 213. If the first type proximity input is not released, the control unit 140 continues operation 211. Otherwise if the first type proximity input is released, the control unit 140 determines whether an end command is detected at operation 215. If the end command is detected, the control unit 140 ends the proximity input procedure. Otherwise if the end command is not detected, the control unit 140 returns the procedure to operation 201.

Meanwhile, if the frequency F0+ΔF is detected through the frequency analysis on the proximity input at operation 205, the control unit 140 determines the proximity input as the second type proximity input at operation 217. Here, the second type proximity input may be determined when the transition from the first type proximity input to the second type proximity input is detected or when the frequency F0+ΔF is detected in tracking the movement on the electronic pen in the state that the button of the electronic pen is pushed. In the case that the second type proximity input is maintained on the touch panel 132, the second type proximity input is maintained continuously even though the button of the electronic pen is released. In the state that the second type proximity input is maintained, the control unit 140 determines whether the button of the electronic device is pushed at operation 219. If the button of the electronic pen is pushed, the electronic pen generates the frequency F0+ΔF.

If the button of the electronic pen is not pushed, the control unit 140 determines whether the second type proximity input is released at operation 223. Otherwise if the button of the electronic pen is pushed, the control unit 140 executes a function corresponding to the second type proximity input at operation 221. Then the control unit 140 determines whether the second type proximity input is released at operation 223. If the second type proximity input is not released, the control unit 140 maintains operation 221. Otherwise if the second type proximity input is released, the procedure goes to operation 215.

Figure 4:
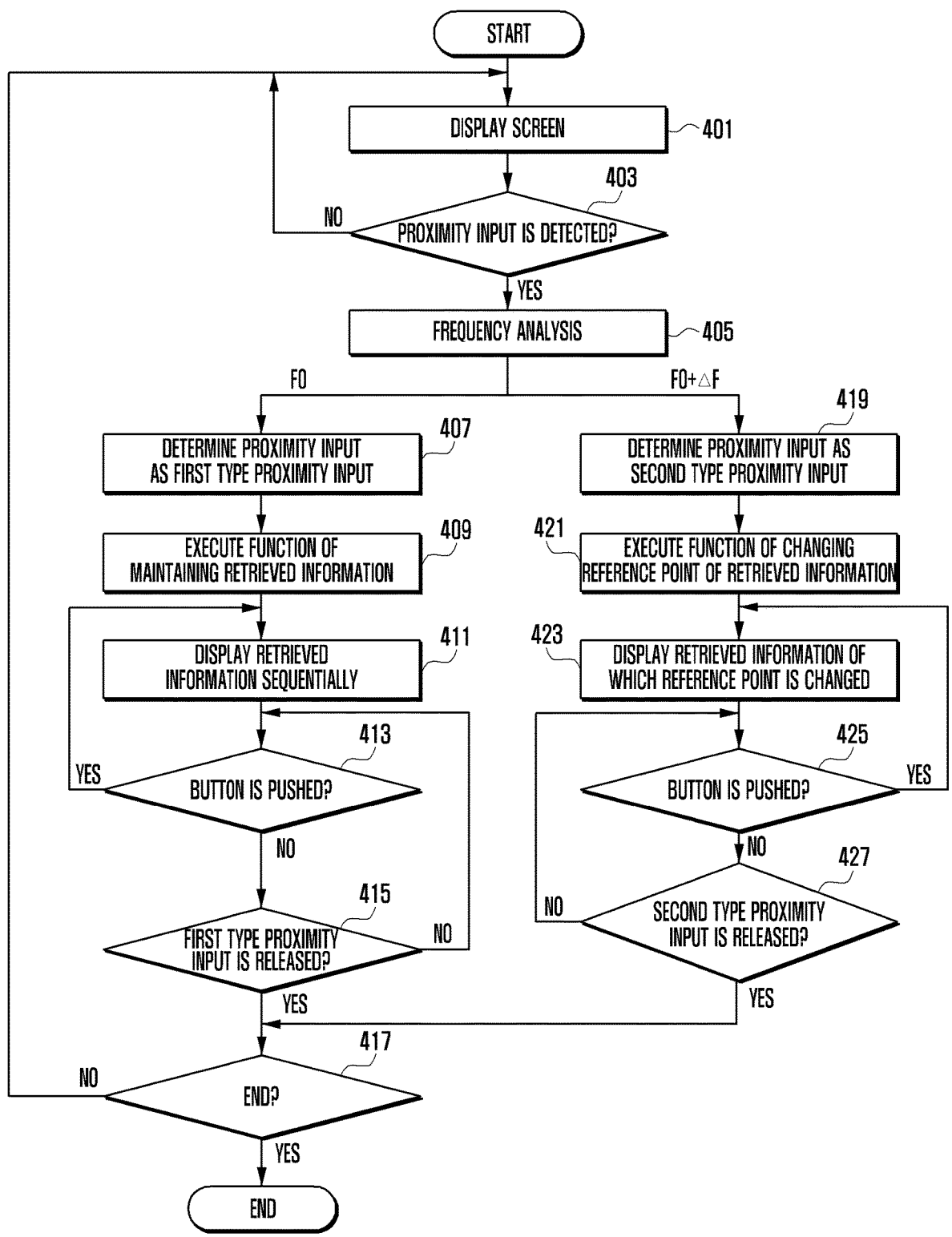
FIG. 4 is a flowchart illustrating an example proximity input processing method according to another embodiment of the present disclosure.

FIG. 4 is a flowchart illustrating a proximity input processing method according to another embodiment of the present disclosure.

Referring to FIG. 4, the control unit 140 displays a screen at operation 401. Here, the screen may be an execution screen of an application such as a music application, a video application, a word processor application, an ebook application, a web browser application, a map application, and a memo application. The application execution screen may include icons, thumbnail images, list items, menu items, text items, and link items.

Next, the control unit 140 determines whether a proximity input is detected above the touch panel 132 in the course of displaying the screen at operation 403. Here, the proximity input may include a hovering gesture made by means of an input tool (e.g. user's finger and electronic pen) in a predetermined distance range above the surface of the touchscreen 130 without contact. For example, if the input tool (e.g. user's finger and electronic pen) is positioned 1-2 cm above the touch screen 130, this may be regarded as a proximity input. In various embodiments, the description is made under the assumption that the input tool is the electronic pen.

If the proximity input is made, the control unit 140 detects the proximity input at operation 403 and performs frequency analysis on the proximity input at operation 405. If the frequency F0 is detected through the frequency analysis on the proximity input at operation 405, the control unit 140 determines the proximity input as the first type proximity input at operation 407. Next, the control unit 140 executes a function of maintaining the current information item in response to the first type proximity input at operation 409. The retrieved information means the internal or related information of the item displayed in response to the proximity input made onto an item displayed on the screen. Next, the control unit 140 controls the display panel 131 to display the next retrieved information sequentially while maintaining the previously retrieved information in response to the first type proximity input at operation 411. In the state that the first type proximity input is maintained, the control unit 140 determines whether the button of the electronic pen is pushed at operation 413. That is, if the frequency F0+ΔF is detected, the control unit 140 determines that the button of the electronic pen is pushed. If the frequency F0+ΔF is detected at operation 413, the control unit 140 returns the procedure to operation 411 to repeat displaying the retrieved information sequentially.

Otherwise if the frequency F0+ΔF is not detected, the control unit determines whether the first type proximity input is released at operation 415. If the first type proximity input is not released, the control unit 140 returns the procedure to operation 413. Otherwise if the first type proximity input is released at operation 415, the control unit 140 determines whether an end command is detected at operation 417. If the end command is detected at operation 417, the control unit 140 ends the proximity input procedure. Otherwise if the end command is not detected, the control unit 140 returns the procedure to operation 401.

If the frequency F0+ΔF is detected through the frequency analysis on the proximity input at operation 405, the control unit 140 determines that the proximity input as the second type proximity input at operation 419. Next, the control unit 140 executes a function of changing the reference point of the retrieved information in response to the second type proximity input at operation 421. Next, the control unit 140 controls the display panel 131 to display the retrieved information of which reference point is changed in response to the second type proximity input at operation 423. In the state that the second type proximity input is maintained, the control unit 140 determines whether the button of the electronic pen is pushed at operation 425. That is, if the frequency F0+ΔF is detected, the control unit 140 determines that the button of the electronic pen is pushed. If the frequency F0+ΔF is detected at operation 425, the control unit 140 and returns the procedure to operation 423 to repeat displaying the reference point changed information sequentially. Otherwise, if the frequency F0+ΔF is not detected, the control unit 140 determines whether the second type proximity input is released at operation 427. If the second type proximity input is not released at operation 427, the procedure goes to step 417.

Figure 5:
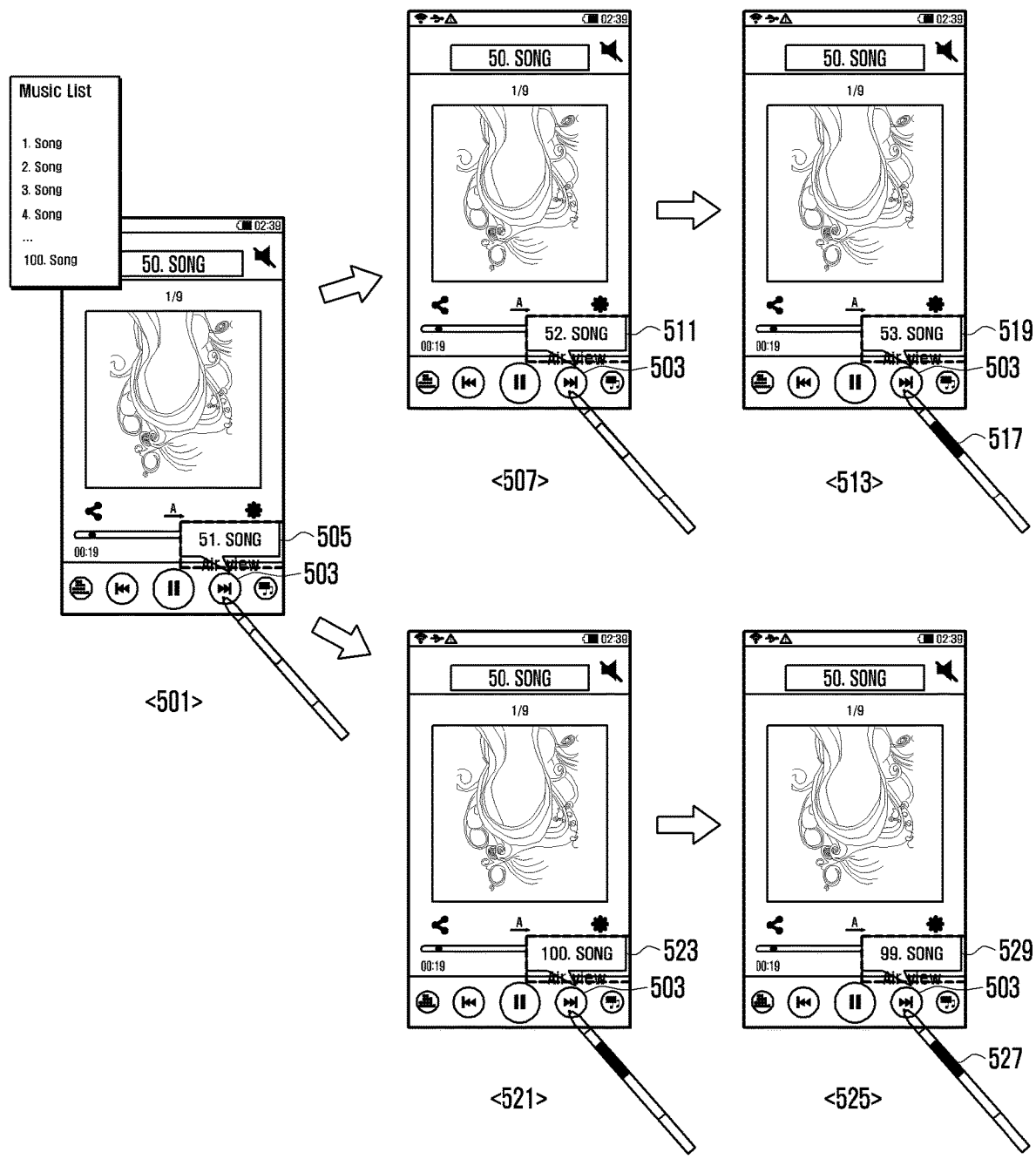
FIG. 5 a diagram illustrating example screen displays for explaining the proximity input processing method according to an embodiment of the present disclosure and, particularly, for explaining the navigating the information items in response to a proximity input.
Figure 6:
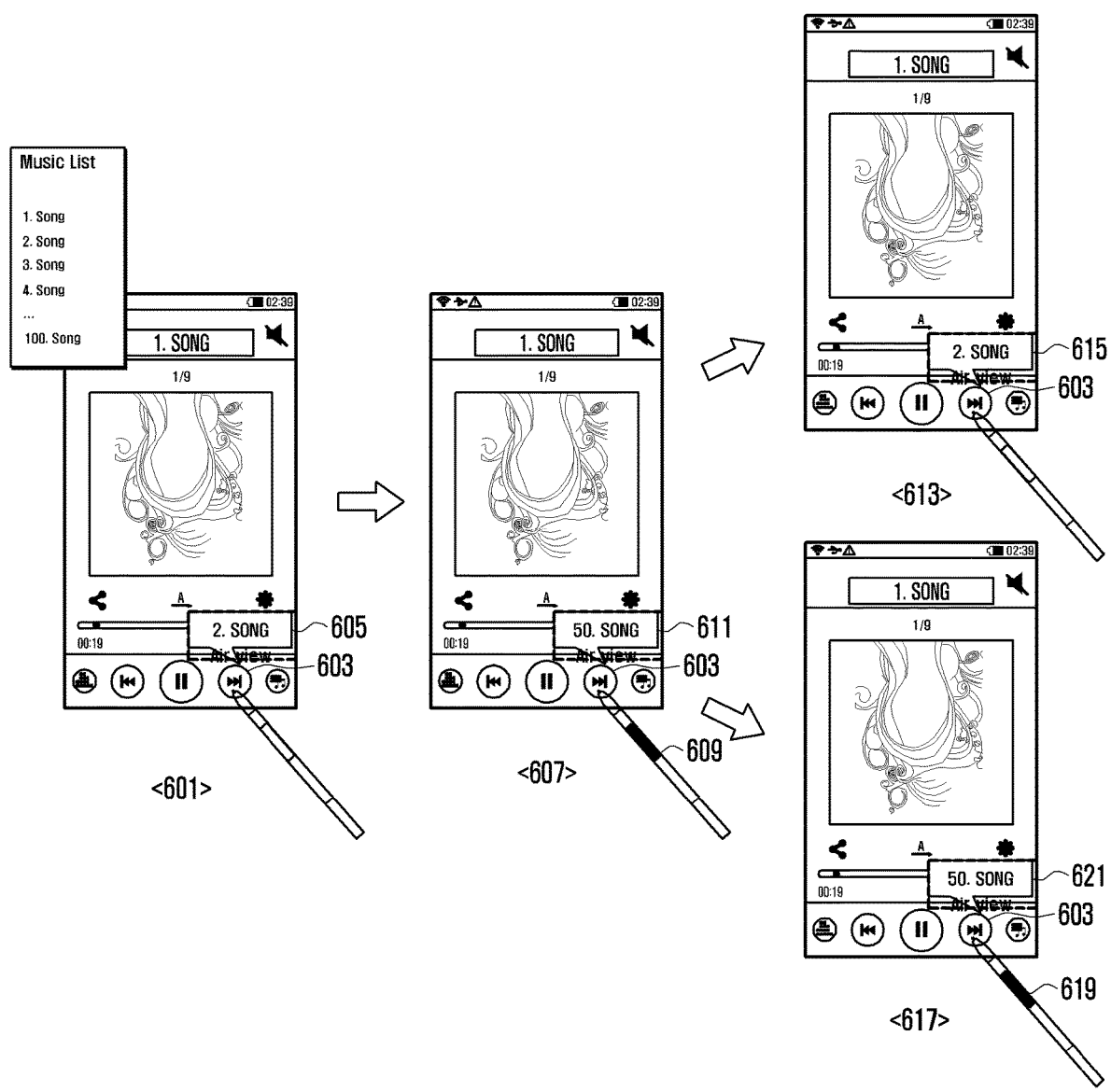
FIG. 6 a diagram illustrating example screen displays for explaining the proximity input processing method according to an embodiment of the present disclosure and, particularly, for explaining the navigating the information items in response to a proximity input.
Figure 7:
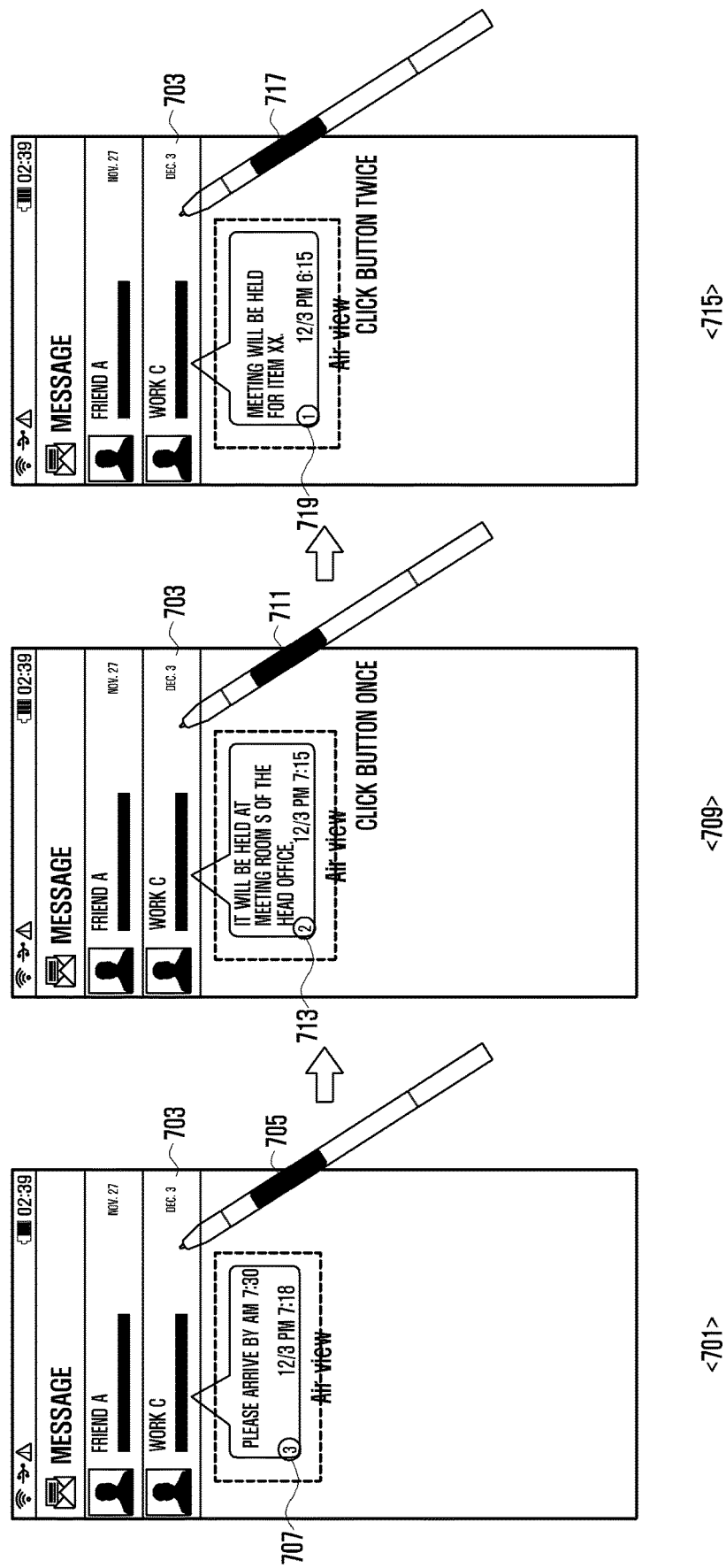
FIG. 7 is a diagram illustrating example screen displays for explaining the proximity input processing method according to an embodiment of the present disclosure and, particularly, for explaining the navigating the information items in response to a proximity input.

FIGS. 5 to 7 are diagrams illustrating example screen displays for explaining the proximity input processing method according to an embodiment of the present disclosure and, particularly, for explaining the navigating the information items in response to a proximity input.

Referring to FIG. 5, the control unit 140 may control the display unit 131 to display a playback screen of the 50$^{th}$ song in the play list having 100 songs as shown in part <501> of FIG. 5. If a proximity input of the electronic pen is detected on the next button in the state that the playback screen is displayed, the information on the next song (the 51$^{st}$ song information) to be played after the current song is displayed in the form of so-called "air view" as denoted by reference number 505. At this time, if the proximity input of the electronic pen is released and then the first type proximity input is made on the next button 503 as shown in part <507> of FIG. 5, the control unit recognizes this as the action for maintaining the information displayed in the form of the air view and thus displays the information on 52$^{nd}$ song in the form of the air view as denoted by reference number 511. If the button of the electronic device is pushed as denoted by reference number 517 in the state that the electronic device is placed above the next button 503 as shown in part <513> of FIG. 5, the information on the next song is displayed in the form of the air view. That is, the 53$^{rd}$ song information is displayed in the form of the air view as denoted by reference number 519. Whenever the button of the electronic pen is pushed, the information on the next songs, i.e. 54$^{th}$ song, 55$^{th}$ song, and so on, are displayed subsequently in the form of the air view.

If the second type proximity input is made to the next button 503 as shown in part <521> of FIG. 5, the control unit 140 may recognize this as an input for changing the reference point of navigation. In the embodiment of FIG. 5, if it is assumed that the reference point of the navigation is the last song information, the control unit 140 controls such that the 100$^{th}$ song information is displayed in the form of the air view as denoted by reference number 523 in response to the second type proximity input. If the button of the electronic pen is pushed as denoted by reference number 527 in the state that the electronic pen is placed to the next button 530 as shown in part <525> of FIG. 5, the control unit 140 controls such that the 99$^{th}$ song information is displayed in the form of the air view as denoted by reference number 529. In this case, whenever the button of the electronic pen is pushed, the information of the previous songs, i.e. 98$^{th}$ song, 97$^{th}$ song, and so on, are displayed subsequently. In this case, since the proximity input is made to the next button, the information on the current song or previous son (e.g. 49$^{th}$ song information) may not be displayed. If the touch input is made to the song information displayed in the form of the air view, the control unit 140 may control to display the corresponding song.

According to another embodiment, if the second type proximity input is detected, the control unit 140 changes the navigation direction. Assuming that the navigation has been made from the 50$^{th}$ song information to the 53$^{rd}$ song information, if the second type proximity input is detected above the next button, the control unit 140 determines this input as the navigation direction change request and displays the 53$^{rd}$ song information in the form of the air view. In this state, if the button of the electronic pen is pushed, the navigation is made backward in the order of the 52$^{nd}$ song information, 51$^{st}$ song information, and so on. In this case, sine the proximity input is made to the next button in the state that the button is pushed, the current song or the previous song (e.g. 49$^{th}$ song) information may not be displayed.

FIG. 6 is a diagram for explaining a function of resetting the information displayed in the form of the air view in response to the first type proximity input and a function of maintain the information in the form of the air view in response to the second type proximity input.

The control unit may control the display unit 131 to display the playback screen of the first song in the play list including 100 songs as shown in part <601> of FIG. 6. If a proximity input of the electronic pen is made to the next button 603 on the screen, the control unit 140 controls such that the second song information is displayed in the form of the air view as denoted by reference number 605. In this state, if the button of the electronic pen is pushed repeatedly as denoted by reference number 609 (e.g. if the button is pushed 49 times), the 50$^{th}$ song information is displayed as denoted by reference number 611. At this time, in order to reset or maintain the information displayed in the form of the air view, a distinct proximity input is utilized. If the first type proximity input is detected in the state that the navigation is made to the 50$^{th}$ song information, the control unit 140 interprets this input as a request for resetting the information displayed in the form of the air view (i.e. reset of the navigation to the 50$^{th}$ song information) and then, if the first type proximity input is made to the next button 603 as shown in part <613>, displays the second song information in the form of the air view as denoted by reference number 615. Meanwhile, if the second type proximity input is detected in the state that the navigation is made to the 50$^{th}$ song information, the control unit 140 interprets this input as a request for maintaining the information displayed in the form of the air view. That is, if the button of the electronic pen is pushed as denoted by reference number 619 in the state that the electronic pen is placed above the next button 603, the 50$^{th}$ song information is displayed in the form of the air view as denoted by reference number 621. If the button of the electronic device is pushed repeatedly in the state that the second type proximity input is maintained, the navigation is made to the song information subsequent to the 50$^{th}$ song information, i.e. the 51$^{st}$ song information, the 52$^{nd}$ song information, and so on, the song information being displayed in the form of the air view. If a touch input is made to the navigated song information, the control unit 140 plays the corresponding song.

FIG. 7 is a diagram for explaining the operation of displaying messages in most recent first order when the second type proximity input is made on the SMS screen. If the second type proximity input is made to an item "Work C" 703 as denoted by reference number 705 on the SMS screen as shown in part <701> of FIG. 7, the control unit displays the most recent message corresponding to "work C" 703 in the form of the air view as shown in part <701> of FIG. 7. In this state, if the button of the electronic device is pushed as denoted by reference number 711, the control unit 140 displays the message right before the most recent message in the form of the air view as denoted by reference number 713 as shown in part <709> of FIG. 7 and then, if the button is pushed again as denoted by reference number 717, displays the message right before the message 713 in the form of the air view as denoted by reference number 719 as shown in part <715> of FIG. 7.

Figure 8:
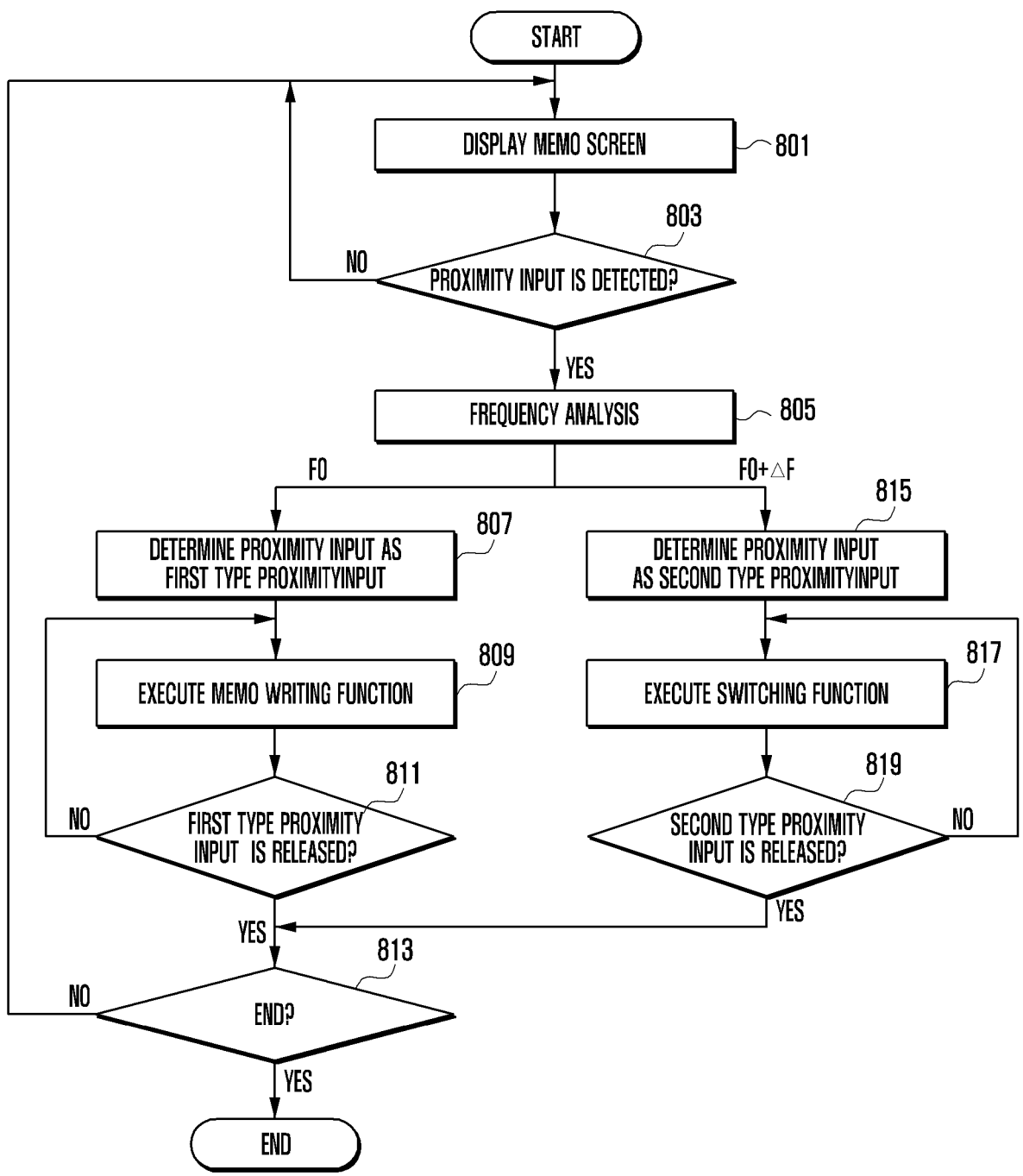
FIG. 8 is a flowchart illustrating an example proximity input processing method according to another embodiment of the present disclosure.

FIG. 8 is a flowchart illustrating a proximity input processing method according to another embodiment of the present disclosure.

Referring to FIG. 8, the control unit 140 controls the display panel 131 to display a memo screen at operation 801. Here, the memo screen is the execution screen of a memo application and includes icons, pictures, list items, menu items, text items, and link items.

The control unit 140 determines whether a proximity input is detected by means of the touch panel 132 in the state that the memo screen is displayed on the display panel 131. Here, the proximity input may include a hovering gesture input which is made by means of an input tool (e.g. user's finger and electronic pen) in a predetermined distance range above the surface of the touchscreen 130 without contact. For example, if the input tool (e.g. user's finger and electronic pen) is positioned 1-2 cm above the touchscreen 130, this may be regarded as a proximity input. In various embodiments, the description is made under the assumption that the input tool is an electronic pen.

If the proximity input is made, the control unit 140 detects the proximity input at operation 803 and performs frequency analysis on the proximity input at operation 805. If the frequency F0 is detected through the frequency analysis on the proximity input at operation 805, the control unit 140 determines the proximity input as the first type proximity input at operation 807. Next, the control unit 140 executes the memo writing function at operation 809. Next, the control unit determines whether the first type proximity input is released at operation 811. If the first type proximity input is not released, the procedure goes to operation 809. Otherwise if the first type proximity input is released at operation 811, the control unit 140 determines whether an end command is detected at operation 813. If the end command is detected at operation 813, the control unit 140 ends the proximity input procedure. Otherwise if the end command is not detected, the control unit 140 returns the procedure to operation 801.

If the frequency F0+ΔF is detected through the frequency analysis on the proximity input at operation 805, the control unit 140 determines that the proximity input as the second type proximity input at operation 815 and executes a screen switching function corresponding to the second type proximity input at operation 817. Here, the screen switching may be made to another application execution screen, an application list screen allowing for execution of a specific application, or a screen for executing the function related to the item at the position where the second type proximity input is detected. If a touch input is made to a certain application from the application list screen, the control unit 140 may executes the corresponding application. Next, the control unit 140 determines whether the second type proximity input is released at operation 819. If the second type proximity input is not released, the procedure goes to operation 817. Otherwise if the second type proximity input is released, the procedure goes to operation 813.

Figure 9:
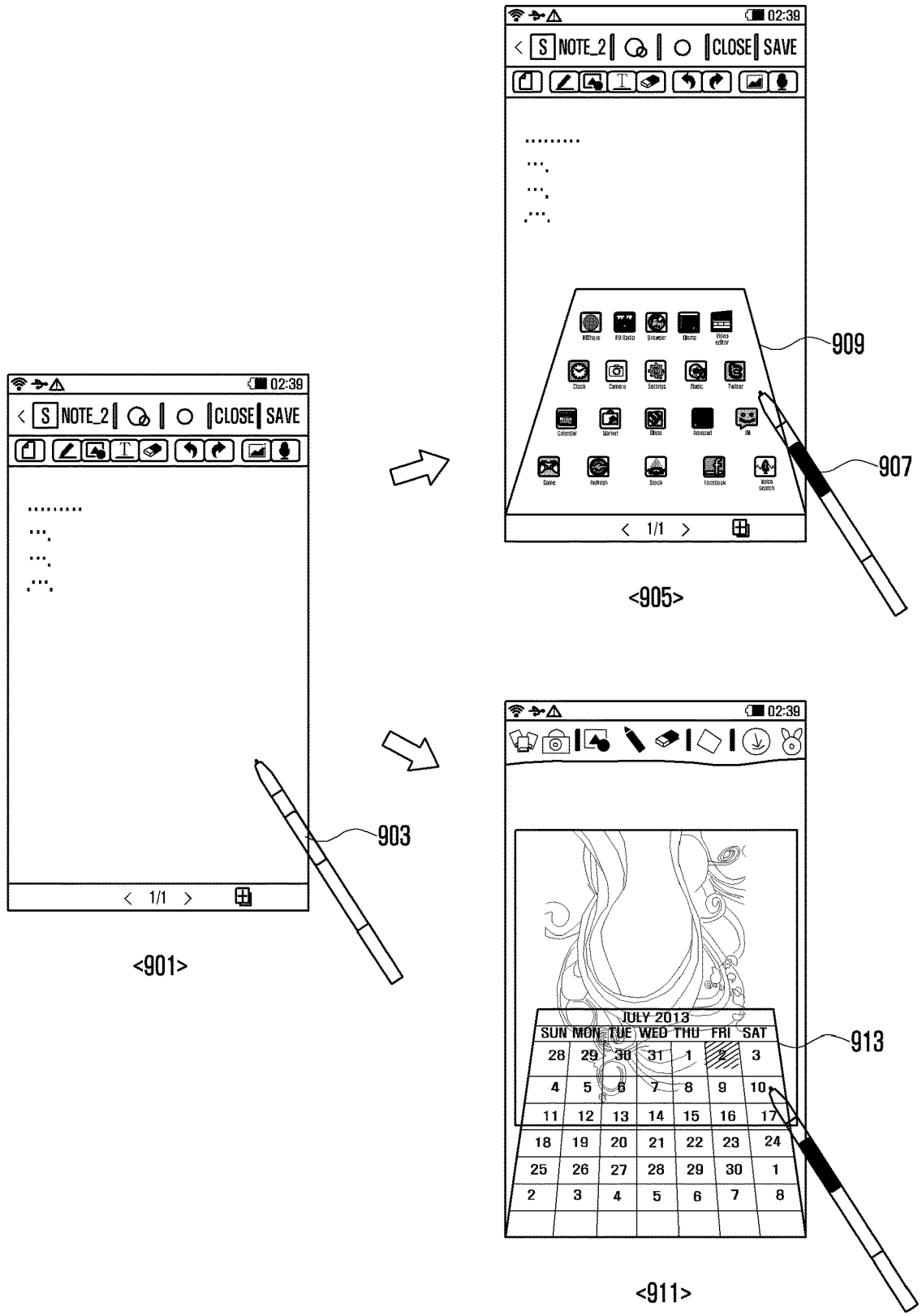
FIG. 9 is a diagram illustrating example screen displays for explaining the proximity input processing method according to an embodiment of the present disclosure.
Figure 10:
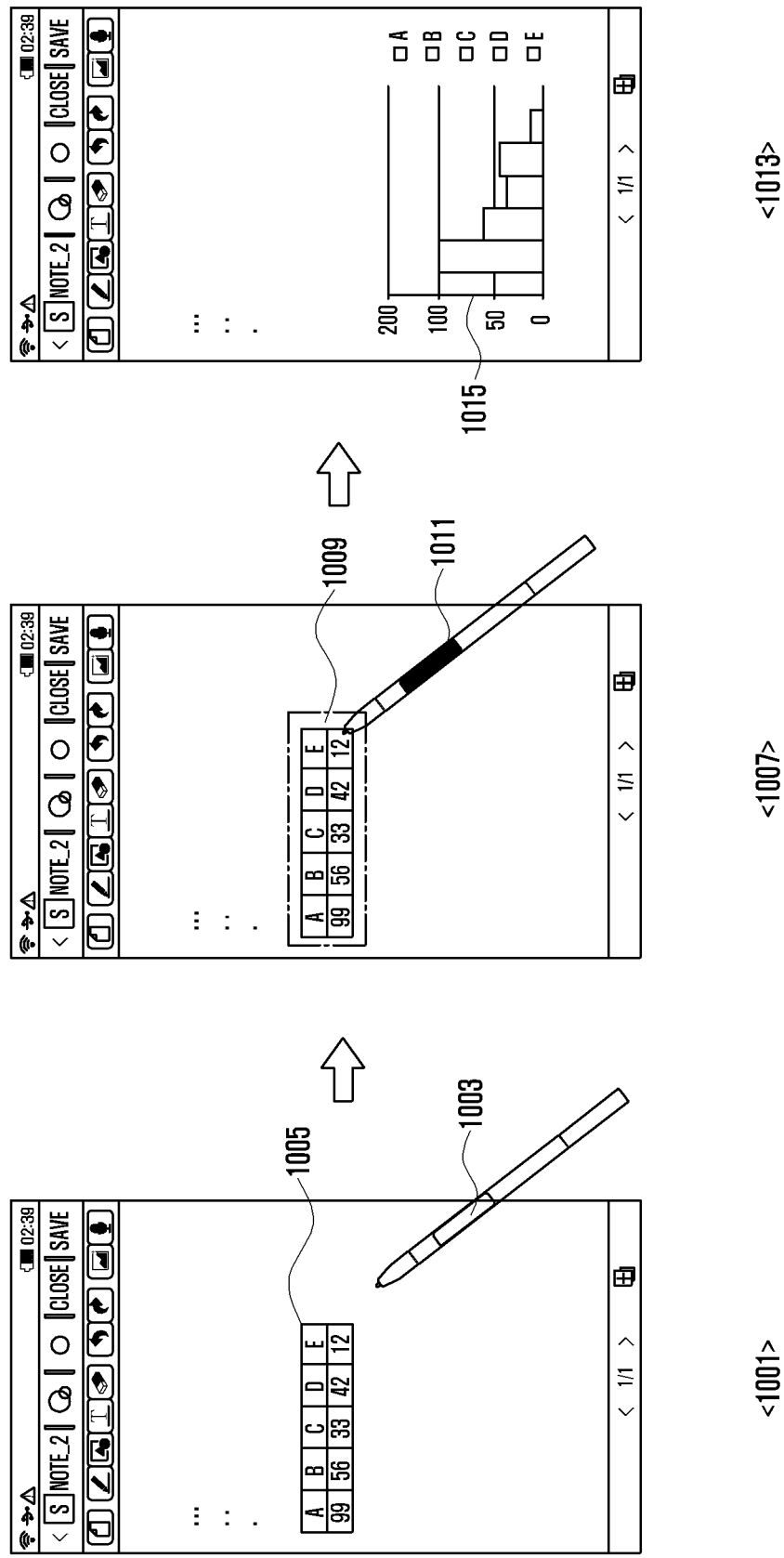
FIG. 10 is a diagram illustrating example screen displays for explaining the proximity input processing method according to an embodiment of the present disclosure.
Figure 11:
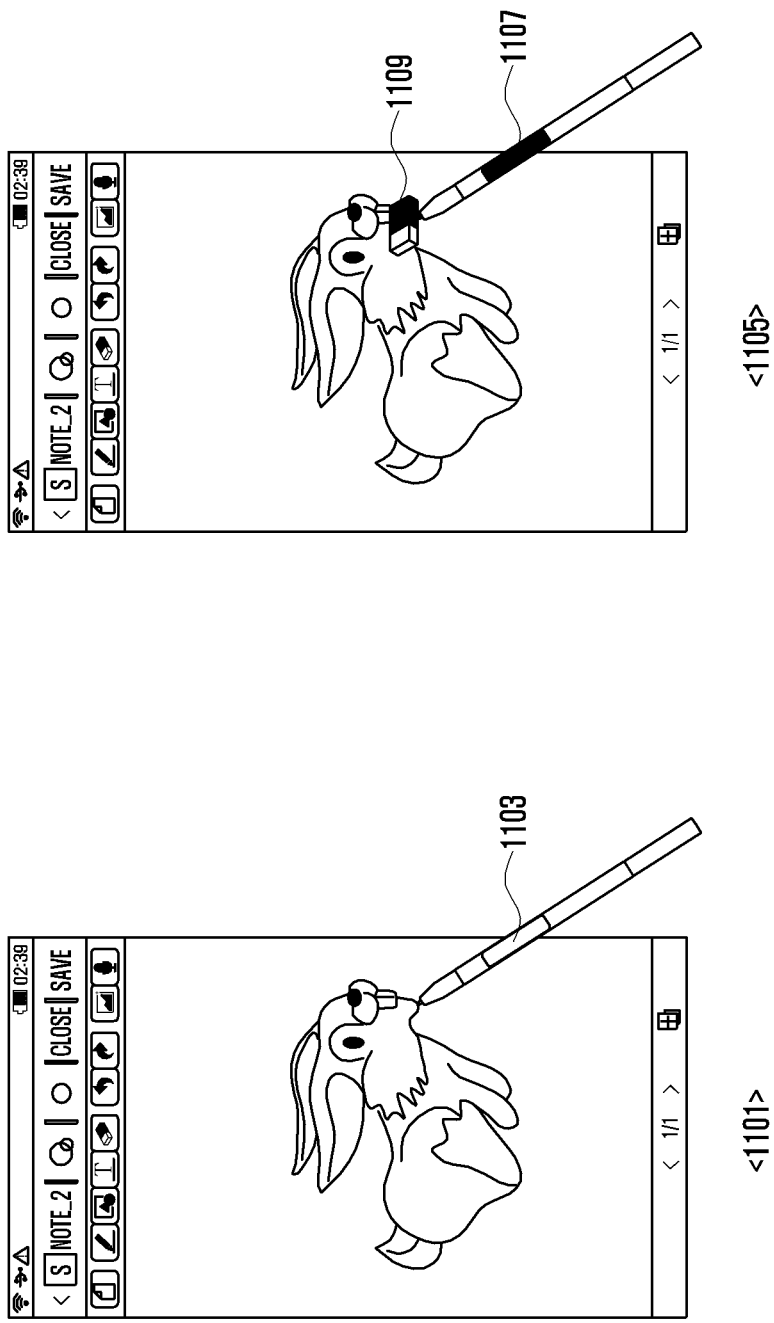
FIG. 11 is a diagram illustrating example screen displays for explaining the proximity input processing method according to an embodiment of the present disclosure.

FIGS. 9 to 11 are diagrams illustrating example screen displays for explaining the proximity input processing method according to an embodiment of the present disclosure.

FIG. 9 is a diagram illustrating example screen displays for explaining the operation of switching to an activated application execution screen and/or an application list screen for executing a certain application. FIG. 10 is a diagram illustrating example screen displays for explaining the operation of switching to a screen for executing a function pertaining to the item to which the second type proximity input is made, and FIG. 11 is a diagram illustrating example screen displays for explaining the operation of executing opposite functions in response to the first and second type proximity inputs.

If the first type proximity input is made as denoted by reference number 903 on the memo writing screen, the control unit 140 executes the memo writing function as shown in part <901> of FIG. 9. For example, the memo function allows the user to write or draw. If the first type proximity input is released (e.g., removed from the screen) and then the second type proximity input is made as denoted by reference number 907, the control unit 140 controls to display the application list window 909 as shown in part <905> of FIG. 9 or, in a different embodiment, an application execution window 913 which capable of allowing to switch from the memo application to another application running on the background as shown in part <911> of FIG. 9. If a touch input is made to a certain application in the application list window, the control unit 140 executes the corresponding application. If the second type proximity input is released, instead of input for application switching or execution, the control unit 140 instead hides the application switching window or the application list window.

In another embodiment, the state that the first type proximity input is made as denoted by reference number 1003 on the memo screen, the control unit 140 may control to display a table 1005 for receiving a touch input to fill the table with a value as shown in part <1001> of FIG. 10. If the first type proximity input is released and then the second type proximity input is made as denoted by reference number 1011 onto the table 1009 as shown in part <1007>, the control unit 140 may create a chart 1015 corresponding to the table as shown in part <1013> of FIG. 10. According to another embodiment, it is possible to present a function equation in response to a touch input made in the state that the first type proximity input is maintained and draw a function graph corresponding to the function equation in response to the second type proximity input made to the function equation.

In the state that the first type proximity input is maintained as denoted by reference number 1103 on the memo screen, it is possible to perform drawing operation mode with a touch input as shown in part <1101> of FIG. 11. If the first type proximity input is released and the second type proximity input is made as denoted by reference number 1107, the control unit 140 may switch the current function to an eraser function mode as denoted by reference number 1109 so as to erase the drawn object.

Figure 12:
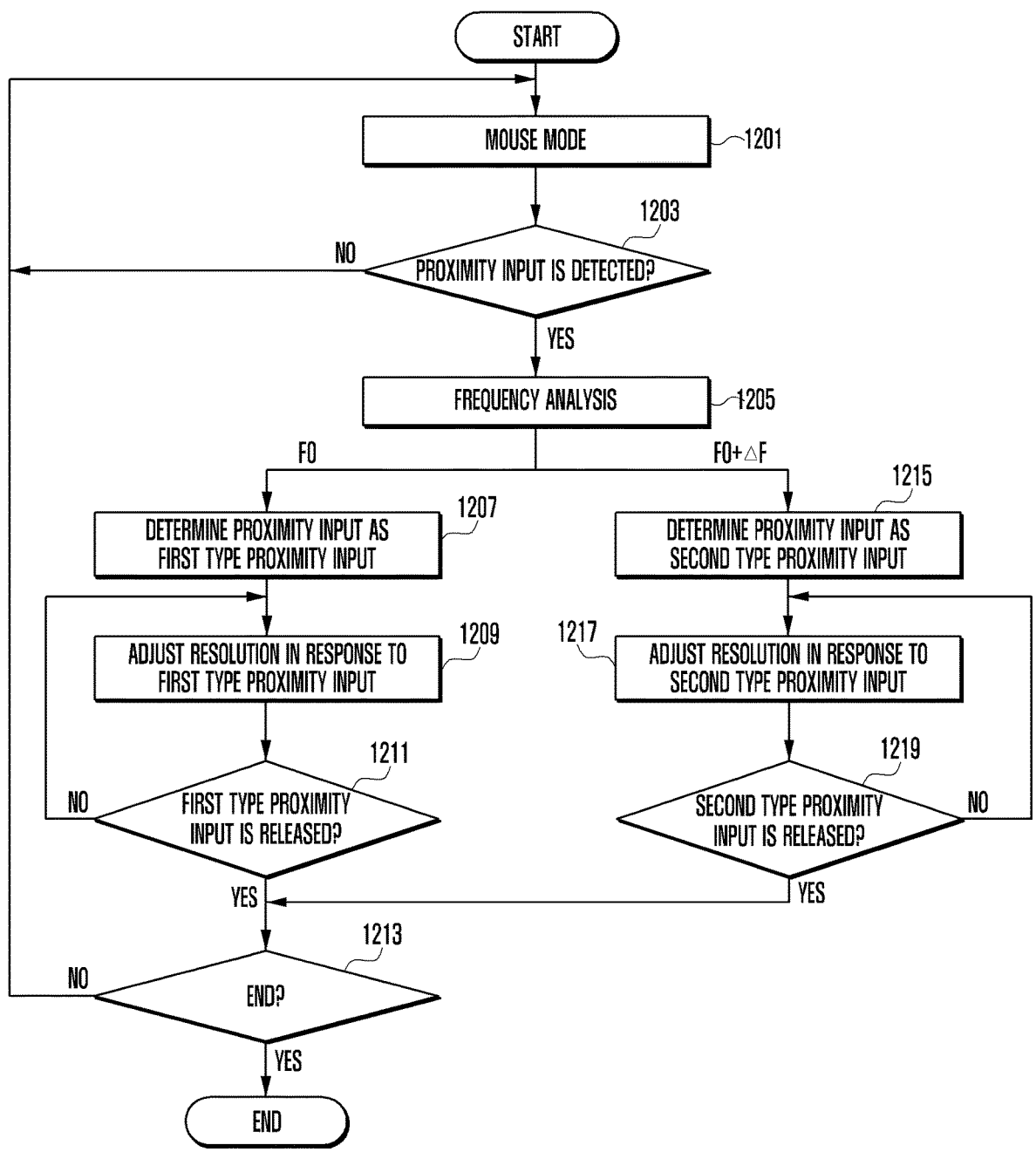
FIG. 12 is a flowchart illustrating an example method of processing a proximity input made with a peripheral device according to an embodiment of the present disclosure.

FIG. 12 is a flowchart illustrating a method of processing a proximity input made with a peripheral device according to an embodiment of the present disclosure.

Referring to FIG. 12, the control unit 140 detects whether the electronic device is operating in the mouse mode at operation 1201. Here, the mouse mode is the operation mode in which the electronic device works as a mouse pad and the electronic pen as a mouse in order for one electronic device to control the other electronic device through a wired/wireless communication channel. A description is made of another embodiment in which the electronic device working as a mouse pad is referred to as a first electronic device and another electronic device connected to the first electronic device through a wired/wireless channel and operates under the control of the first electronic device is referred to as a second electronic device.

The control unit 140 of the first electronic device determines whether a proximity input is detected by means of the touch panel 132 at operation 1203. Here, the proximity input may include a hovering gesture input which is made by means of an input tool (e.g. user's finger and electronic pen) in a predetermined distance range above the surface of the touchscreen 130 without contact. For example, if the input tool (e.g. user's finger and electronic pen) is positioned 1-2 cm above the touchscreen 130, this may be regarded as a proximity input. In the following, the description is made under the assumption that the input tool is an electronic pen.

If a proximity input is made with the electronic pen, the control unit 140 detects the proximity input at operation 1203 and performs frequency analysis on the proximity input at operation 1205. If the frequency F0 is detected through the frequency analysis on the proximity input at operation 1205, the control unit 140 determines the proximity input as the first type proximity input at operation 1207. Next, the control unit 140 executes a resolution adjustment function corresponding to the first type proximity input at operation 1209. In various embodiments, the description is directed to the case where the resolution adjustment is made to the default resolution in response to the first type proximity input. After the resolution adjustment, the control unit 140 determines whether the first type proximity input is released at operation 1211. If the first type proximity input is not released, the control unit 140 returns the procedure to operation 1209. Otherwise if the first type proximity input is released at operation 1211, the control unit 140 determines whether an end command is detected at operation 1213. If the end command is detected at operation 1213, the control unit 140 ends the proximity input procedure. Otherwise if the end command is not detected, the control unit 140 returns the procedure to operation 1201.

If the frequency F0+ΔF is detected through the frequency analysis on the proximity input at operation 1205, the control unit 140 determines that the proximity input as the second type proximity input at operation 1215 and executes a resolution adjustment function corresponding to the second type proximity input at operation 1217. In various embodiments, the description is directed to the case where the resolution adjustment is made from the default resolution to a lower or higher resolution in response to the first type proximity input. Next, the control unit 140 determines whether the second type proximity input is released at operation 1219. If the second type proximity input is not released, the procedure goes to operation 1217. Otherwise if the second proximity is released, the procedure goes to operation 1213.

FIG. 13 is a diagram illustrating example screen displays for explaining a proximity input processing operation between electronic devices according to an embodiment of the present disclosure.

Referring to FIG. 13, the first and second electronic devices 1301 and 1303 are connected, and the second electronic device 1303 operates in the mouse mode for controlling the operation of the first electronic device 1301. In detail, if the first type proximity input is made on the second electronic device 1303 as shown in part <1305> of FIG. 13, the first electronic device 1301 is configured with the default resolution, and the electronic pen works as a pen mouse operating at the default speed. If the second type proximity input of the electronic pen is made to the second electronic device 1303 in the mouse mode as denoted by reference number 1313, the first electronic device 1301 changes the screen resolution from the default resolution to a higher resolution as shown in part <1307> of FIG. 13. At this time, the electronic pen may work as the pen mouse configured with low pointer movement speed. If the second type proximity input of the electronic pen is made to the second electronic device 1303 in the mouse mode as denoted by reference number 1315, the first electronic device 1301 changes the screen resolution from the default resolution to a lower resolution as shown in part <1311> of FIG. 13. At this time the electronic pen may work as the pen mouse configured with high pointer movement speed. The pointer movement speed may be controlled according to the first and second type proximity inputs regardless of the resolution. Also, the resolution may be controlled according to the first and second type proximity inputs regardless of the pointer movement speed.

Figure 14:
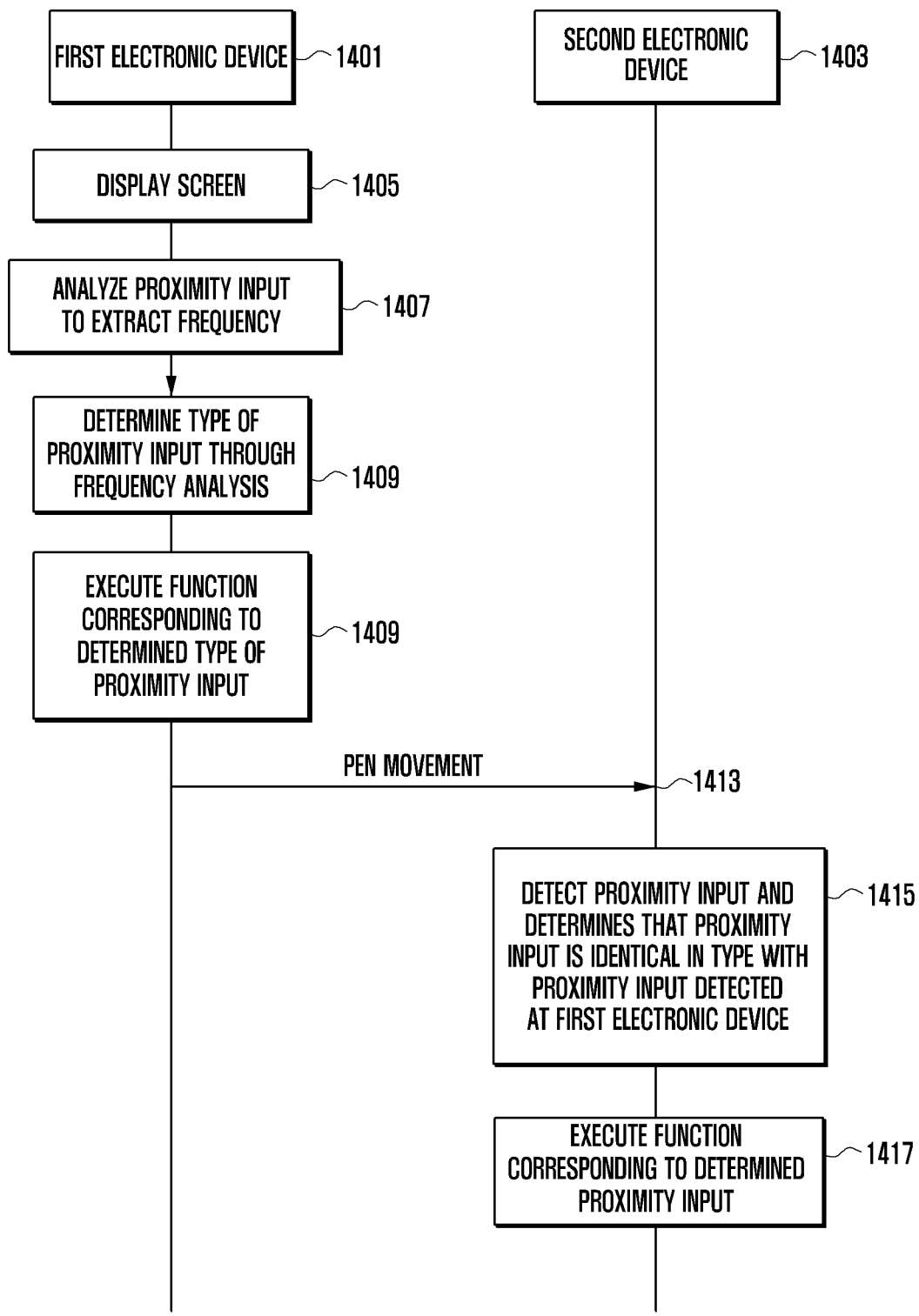
FIG. 14 is a flow chart illustrating an example proximity input processing procedure between two electronic devices according to an embodiment of the present disclosure.

FIG. 14 is a flow chart illustrating a proximity input processing procedure between two electronic devices according to an embodiment of the present disclosure.

Referring to FIG. 14, the first electronic device 1401 displays a screen at operation 1405. Next, the first electronic device 1401 detects a proximity input and performs frequency analysis on the proximity input at operation 1407. Next, the first electronic device 1401 determines the type of the proximity input based on the frequency analysis result. If the frequency F0 is extracted, the proximity input is determined as the first type proximity input and, otherwise if the frequency F0+ΔF is extracted, the proximity input is determined as the second type proximity input. Next, the first electronic device 1401 executes the function corresponding to the determined proximity input type at operation 1411. Next, the first electronic device detects the movement of the electronic pen to the second electronic device 1403 at operation 1413. As the result of the movement of the electronic pen, the second electronic device 1403 detects a proximity input made with the electronic pen and determines that the proximity input is identical in type with the proximity input detected at the first electronic device 1401 at operation 1415, and then executes the function corresponding to the determined proximity input type at operation 1417.

Figure 15:
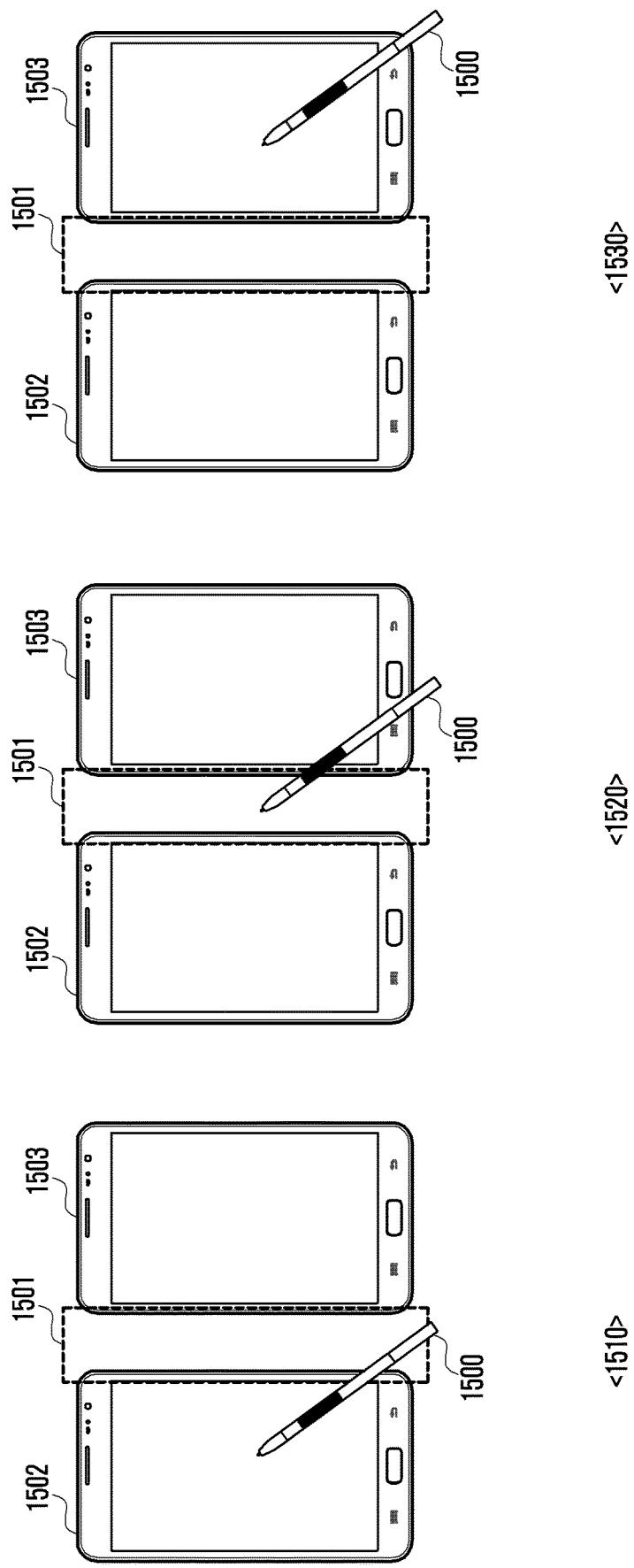
FIG. 15 is a diagram for explaining example proximity input processing operations between two electronic devices according to an embodiment of the present disclosure.

FIG. 15 is a diagram for explaining the proximity input processing operations between two electronic devices according to an embodiment of the present disclosure.

FIG. 15 is directed to a situation where the first and second electronic devices 1502 and 1503 are arranged side by side and the electronic pen moves from the touch panel of the first electronic device 1502 to the touch panel of the second electronic device 1503 such that the proximity input started at the first electronic device 1502 is maintained in the space between the first and second electronic devices 1502 and 1503 to the second electronic device 1503.

In the case that the first and second electronic devices 1502 and 1503 are arranged side by side as shown in FIG. 15, a proximity input may be made with a movement of the electronic pen 1500 which starts from the first electronic device 1502 as shown in part <1510> and crosses the space between the first and second electronic device 1502 and 1503 (area in which touch and/or proximity is not detected) as shown in part <1520> and then reaches the second electronic device 1503 as shown in part <1530> of FIG. 15. For example, the electronic pen 1500 may be used for exchanging information (e.g. content transfer and copy) or exchanging any input information through a short range communication link with a touch and/or proximity input. If the same type proximity input is detected across the confronting edge areas of the first and second electronic devices 1502 and 1503 sequentially (e.g. from the first electronic device to the second electronic device or vice versa), the function executed at the first electronic device in correspondence to the proximity input of the electronic pen 1500 may be maintained. In detail, if the electronic pen 1500 moves to the second electronic device in the state that a function is executed at the first electronic device 1502 in response to the first type proximity input of the electronic pen, the first type proximity input is maintained such that the second electronic device 1503 executes the same function as the first electronic device 1502. Also, if the electronic pen 1500 moves to the second electronic device in the state that a function is executed at the first electronic device 1502 in response to the second type proximity input of the electronic pen, the second type proximity input is maintained such that the second electronic device 1503 executes the same function as the first electronic device 1502.

As described above, in the input processing method and apparatus of an electronic device of the present disclosure, the proximity input interface is extended so as to apply enhanced User Interface/User Experience (UI/UX), which could not be used in the past, to the electronic device.

Also, the input processing method and apparatus of the electronic device of the present disclosure is applicable through software modification without change of the structure of the electronic pen.

Although various embodiments of the present disclosure have been described using specific terms, the specification and drawings are to be regarded in an illustrative rather than a restrictive sense in order to help understand the present disclosure. It is obvious to those skilled in the art that various modifications and changes can be made thereto without departing from the broader ambit of the disclosure.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA.

As would be understood in the art, the computer, the processor, microprocessor controller or the programmable hardware include memory components, e.g., RAM, ROM, Flash, etc. that may store or receive software or computer code that when accessed and executed by the computer, processor (e.g., the control unit 140) or hardware implement the processing methods described herein. In addition, it would be recognized that when a general purpose computer accesses code for implementing the processing shown herein, the execution of the code transforms the general purpose computer into a special purpose computer for executing the processing shown herein.

Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

In addition, an artisan understands and appreciates that a "processor" or "micro processor" constitute hardware in the claimed disclosure. Under the broadest reasonable interpretation, the appended claims constitute statutory subject matter in compliance with 35 U.S. C. § 101.

What is claimed is:

1. An input processing method of an electronic device, the method comprising:
displaying, by a processor of the electronic device, a screen on a touchscreen;
detecting, by the processor, a hover input having a first non-zero frequency by proximity of a stylus with respect to the touchscreen, wherein a location of the hover input is outside the touchscreen;
in response to the stylus crossing a boundary of the touchscreen and a button of the stylus being deactivated, determining that the first non-zero frequency transitioned into a second frequency and that the hover input is a first type hover input;
in response to the stylus crossing the boundary of the touchscreen and the button of the stylus being activated, determining that the first non-zero frequency transitioned into a third frequency different from the second frequency and that the hover input is a second type hover input;

executing, by the processor, a first function associated with the displayed screen based on the determination that the hover input is the first type hover input; and executing, by the processor, a second function, different from the first function, associated with the displayed screen based on the determination that the hover input is the second type hover input.

2. The method of claim 1, wherein the first function or the second function comprises at least one of:

navigating a preview for media playback if the screen is a media player screen;

resetting a navigation preview for media playback if the screen is the media player screen;

navigating a preview for a list of messages for a particular contact if the screen is a messenger screen;

switching a currently displayed screen;

automatically generating a graph from a table if the screen is a memo screen;

switching between a marking mode and an eraser mode if the screen is the memo screen; and altering a screen resolution of the electronic device.

3. The method of claim 2, wherein the first function or the second function comprises switching the currently displayed screen to at least one of:

a screen for an another application previously executing in a background; and an application list window, wherein a contact-based touch selection to an icon in the application list window causes execution and display of an application corresponding to the icon.

4. The method of claim 1, further comprising:

detecting a release of the first type hover input; and after detecting the release:
executing a third function if the first type hover input is re-detected, and
executing a fourth function if the second type hover input is re-detected.

5. The method of claim 4, wherein:

if the first type hover input is detected again after the first type hover input is released, executing the third function upon detecting activation of the button of the stylus; and if the second type hover input is detected after the first type hover input is released, executing the fourth function upon detecting activation of the button of the stylus.

6. The method of claim 5, wherein:

the screen is a media player screen and the first function or the second function is displaying a track preview if the first type hover input or the second type hover input is detected over a next track or previous track button displayed as part of the media player screen; and the third function is switching the track preview to a next track relative to a currently displayed track, and the fourth function is switching the track preview to a previous track relative to the currently displayed track.

7. The method of claim 1, wherein the screen is a messenger screen, and the method further comprises:

displaying a message preview if the first type hover input is detected over a listed contact in the messenger screen; and if the button of the stylus is activated while the first type hover input is maintained over the listed contact, switching the message preview to another message for the listed contact.

8. The method of claim 1, wherein:

the screen is a memo screen;

the first function comprises generating a table within the memo screen; and the second function, if detected on the table, comprises generating a graph corresponding to data included in the table.

9. The method of claim 1, wherein the screen is a memo screen, the first function comprises a drawing mode in the memo screen, and the second function comprises an eraser mode in the memo screen.

10. The method of claim 1, wherein executing of the first function or the second function comprises, when the hover input is made across from the electronic device to an external electronic device connected through a transceiver and the external electronic device detects the hover input, maintaining execution of the first function or the second function on the external electronic device.

11. An electronic device comprising:

a touchscreen; and a processor configured to:
control the touchscreen to display a screen,
detect a hover input having a first non-zero frequency by proximity of a stylus with respect to the touchscreen, wherein a location of the hover input is outside the touchscreen,
in response to the stylus crossing a boundary of the touchscreen and a button of the stylus being deactivated, determine that the first non-zero frequency transitioned into a second frequency and that the hover input is a first type hover input;
in response to the stylus crossing the boundary of the touchscreen and the button of the stylus being activated, determine that the first non-zero frequency transitioned into a third frequency different from the second frequency and that the hover input is a second type hover input;
execute a first function associated with the displayed screen based on an input on the determination that the hover input is the first type hover input, and
execute a second function, different from the first function, associated with the displayed screen based on the determination that the hover input is the second type hover input.

12. The electronic device of claim 11, wherein the processor is further configured to:

detect a release of the first type hover input; and after detecting the release:
execute a third function if the first type hover input is re-detected, and
execute a fourth function if the second type hover input is re-detected.

13. The electronic device of claim 12, wherein the processor is further configured to:

if the first type hover input is detected again after the first type hover input is released, execute the third function upon detecting activation of the button of the stylus; and if the second type hover input is detected again after the first type hover input is released, execute the fourth function upon detecting activation of the button of the stylus.

14. The electronic device of claim 11, wherein the first function or the second function comprises at least one of:
- navigating a preview for media playback if the screen is a media player screen;
- navigating a preview for a list of messages for a particular contact if the screen is a messenger screen;
- switching a currently displayed screen;
- automatically generating a graph from a table if the screen is a memo screen;
- switching between a marking mode and an eraser mode if the screen is the memo screen; and
- altering a screen resolution of the electronic device.

15. The electronic device of claim 11, wherein the processor is further configured to, when the hover input is made across from the electronic device to an external electronic device connected through a transceiver and the external electronic device detects the hover input, maintain execution of the first function or the second function on the external electronic device.

* * * * *